United States Patent [19]

Fjällbrant

[11] 4,371,973
[45] Feb. 1, 1983

[54] APPARATUS FOR TRANSFORMING, TRANSFERRING AND RE-TRANSFORMING OF A SAMPLED SIGNAL

[76] Inventor: Tore Fjällbrant, Hökåsvägen, pl. 67, 430 80 Hovås, Sweden

[21] Appl. No.: 158,241

[22] Filed: Jun. 10, 1980

[30] Foreign Application Priority Data

Jun. 19, 1979 [SE] Sweden ............................... 7905408

[51] Int. Cl.³ ..................... H03K 3/013; H03K 5/156
[52] U.S. Cl. ....................................... 375/58; 370/23; 179/1 SA
[58] Field of Search ........... 179/1 SA, 15.55 R, 1 SB, 179/1 SC, 1 SD; 370/23, 84, 79; 364/724; 375/58

[56] References Cited

U.S. PATENT DOCUMENTS

| 4,140,876 | 2/1979 | Gagnon | 179/1 SA |
| 4,271,500 | 6/1981 | Fjallbrant | 179/1 SA |

*Primary Examiner*—Benedict V. Safourek
*Assistant Examiner*—Stephen Chin
*Attorney, Agent, or Firm*—Silverman, Cass & Singer, Ltd.

[57] ABSTRACT

An apparatus for transmitting and receiving signals representing such as speech. The apparatus provides for transforming a uniformly sampled signal to a non-uniformly sampled signal in a transmitter, transferring the signal thus non-uniformly sampled to a receiver and re-transforming the transferred non-uniformly sampled signal to a uniformly sampled signal in the receiver. In the transmitter, both a wave analyzer and a time-frequency transformer are coupled between a delay chain and a logic unit. A switch also is provided for excluding certain samples in response to a control signal from the logic unit. The control signal contains information on frequency sectors comprising samples with signal amplitudes which are low in relation to samples in other sectors. In the receiver, two delay chains are coupled together in series and one of the delay chains is coupled to a multiplication circuit. The output of the multiplication circuit is coupled to an addition circuit providing the output of the apparatus. The logic signal is received by the receiver and is used to select the multiplication coefficients for the multiplication circuit. The signals re-transformed have better quality due to the elimination of quantization noise and a more exact transfer of the frequency content of the signal.

2 Claims, 4 Drawing Figures

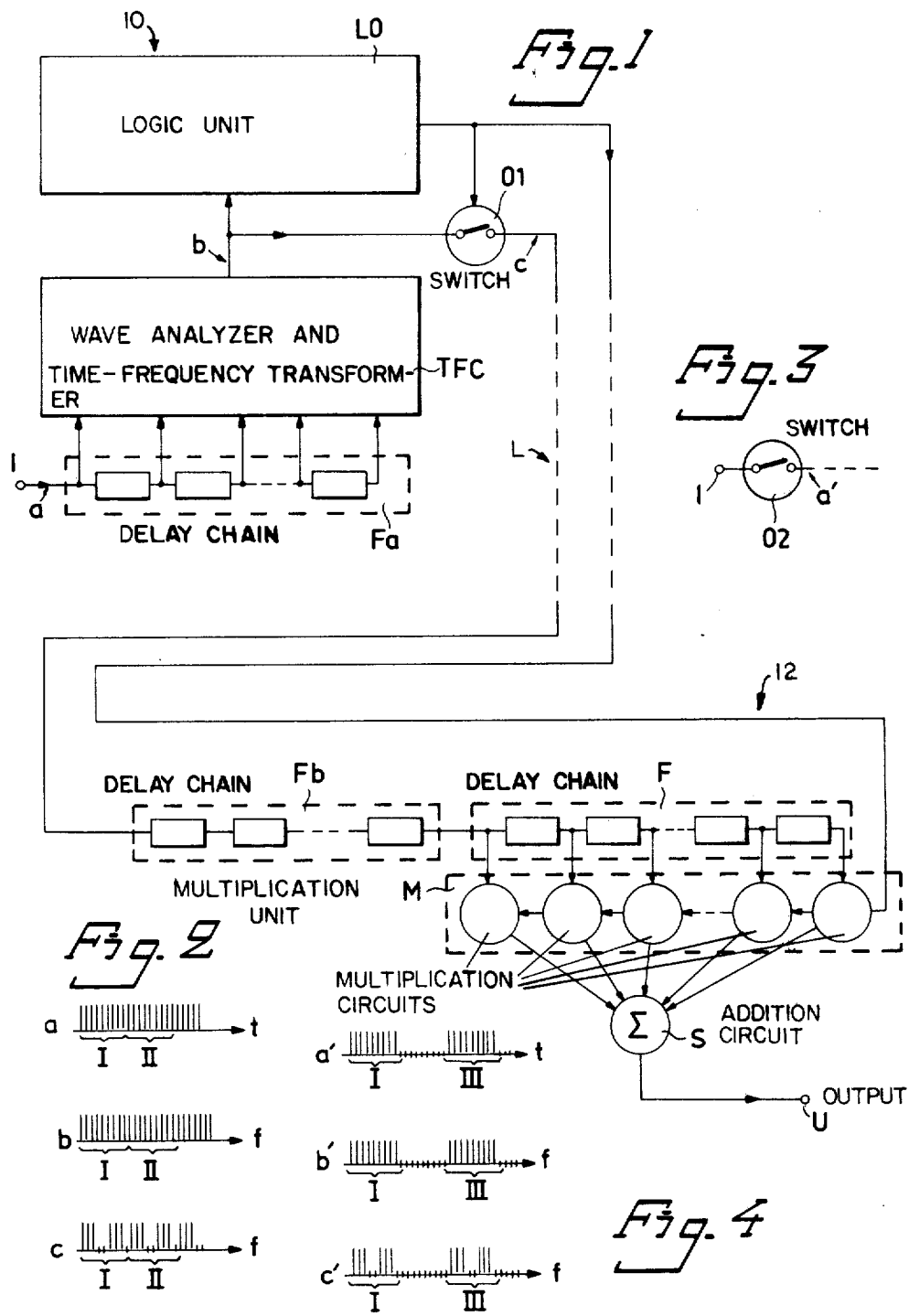

APPARATUS FOR TRANSFORMING, TRANSFERRING AND RE-TRANSFORMING OF A SAMPLED SIGNAL

TECHNICAL FIELD

This invention relates to an apparatus for transforming, transferring and re-transforming a sampled signal, more precisely for transforming a uniformly sampled signal to a non-uniformly sampled signal in a transmitter, transferring said non-uniformly sampled signal to a receiver and re-transforming the tranferred non-uniformly sampled signal to a uniformly sampled signal in the receiver.

STATE OF ART

Apparatuses are previously known which on the transmitter side comprise:

a delay chain with a plurality of outputs, a wave analyzer for emitting signals divided into frequency sectors, connected on its input side to the outputs of the delay chain and on its output side to a logic unit for analyzing the signals from the wave analyzer and for generation of a control signal depending on the result of said analysis and intended for the receiver, a time-frequency transformer for transforming signal blocks of samples in the time domain to corresponding signal blocks of samples in the frequency domain, and a switch for excluding certain samples in blocks of samples in the frequency domain.

Such known apparatuses on the receiver side comprise:

a frequency-time transformer for re-transforming signal blocks of samples in the frequency domain to corresponding signal blocks of samples in the time domain, and a reconstruction unit intended to reconstruct previously excluded samples and comprising a delay chain with a plurality of outputs, a multiplication unit connected on its input side to the outputs of the delay chain and intended for weighted multiplication of samples with coefficients stored in a memory under control by the control signal from the transmitter, and an addition unit connected on its input side to outputs on the multiplication unit and intended for the addition of samples thus weighted.

Apparatuses of the aforesaid kind per se have been proven to operate satisfactorily. But, they suffer from a certain disturbing quantization noise which should be traced from the fact that the multiplication coefficients have relatively high amplitude values when signal samples are weighted in the time domain. It also has by experiments been proven possible to obtain an improved speech quality by modifying the function of the logic unit so that better adaptability to changes in the speech signal is obtained.

DESCRIPTION OF THE INVENTION

The object of the present invention, thus, is to eliminate disturbing quantization noise and to improve the speech quality by ensuring better adaptability to changes in the speech signal. A more natural speech is obtained due to the fact, that the entire frequency content of the speech signal is transferred more exactly.

The characterizing features of an apparatus designed according to the invention become apparent from the attached claims.

According to the present invention, apparatuses of the kind referred to above are designed so that, on the transmitter side, both the time-frequency transformer and also the wave analyzer are coupled-in coupled between the delay chain and logic unit. Also, the switch for excluding certain samples is arranged so as to be controlled by the control signal from the logic unit, which control signal contains information on frequency sectors comprising samples with signal amplitudes being low in relation to samples in other sectors. On the receiver side, the delay chain is preceded by a second delay chain having at least as many delay elements as the firstmentioned delay chain of the receiver, and the addition circuit on its output side is directly connected to the output of the apparatus.

DESCRIPTION OF FIGURES

The invention is described in greater detail in the following, with reference to the accompanying drawing, in which FIG. 1 is a schematic view of a block diagram for an apparatus according to the invention, FIG. 2 is a charts of samples referable to the transmitter part of the apparatus according to FIG. 1, FIG. 3 shows a modification of the transmitter part of the apparatus according to FIG. 1, and FIG. 4 is a charts of samples referable to the modified transmitter part.

PREFERRED EMBODIMENT

The apparatus according to FIG. 1 comprises a transmitter part 10 and a receiver part 12 coupled together over a transfer medium L.

The transmitter part 10 comprises a delay chain Fa, which is connected to the input 1 of the apparatus and is provided with a plurality of outputs; a wave analyzer for emitting signals divided into frequency sectors and a time-frequency transformer for transforming signal blocks of samples in the time domain to corresponding signal blocks of samples in the frequency domain (designated together by TFC in FIG. 1); a logic unit LO for analyzing the signals from the unit TFC and for generation of a control signal depending on the result of said analyzing; and a switch O1 for excluding certain samples in blocks of samples in the frequency domain. The time-frequency transformer and the wave analyzer can (but need not necessarily) be the same identical unit, because the frequency sectors of the analyzer can be identical with the frequencies of the individual samples in the frequency domain at the output of the time-frequency transformer. The unit TFC, thus, is coupled between the delay chain Fa and the logic unit LO. The switch O1 is coupled between the output side of the unit TFC and the transfer medium L to the receiver part and is controlled by the control signal from the logic unit LO. The control signal contains information on frequency sectors comprising samples with signal amplitudes being low in relation to samples in other sectors, for example momentary information on three blocks among a total of nine blocks. The receiver part comprises a reconstruction unit F-M-S intended for reconstructing previously excluded samples and comprising a delay chain F with a plurality of outputs; a multiplication unit M connected on its input side to the outputs of the delay chain F and intended for weighted multiplication of samples with coefficients stored in a memory, the multiplication being under control of the control signal from the logic unit LO; and an addition unit S connected of its input side to outputs on the multiplication unit M and intended for the addition of samples thus weighted. The memory may be located, together with the multiplication circuits, in the circles in the unit M. The delay chain F is preceded by a second delay chain Fb having at least as many delay elements as the delay chain F. The addition circuit S is directly connected on its output side to the output U of the apparatus.

FIG. 2 is a chart a of blocks of samples in the time domain on the input side of the delay chain Fa, a chart b of the blocks of samples transformed to the frequency domain on the output side of the unit TFC, and a chart c of the transformed samples the frequency domain after the switch 01. The charts a and b refer to a uniformly sampled signal divided into blocks I,II . . . with nine samples in each block, while the charts c refers to a non-uniformly sampled signal where three samples in each block are excluded.

In the unit TFC the signal samples in the time domain are transformed in known manner block-wise (of, for example, nine samples) to corresponding samples in the frequency domain by means of discrete Fourier transform, discrete cosine transforms or transformation according to the publication "A system for data-reduced transmission of speech signals", T. Fjällbrandt, ISY Report 0304 July 6, 1979, Institute for System Technology, University in Linköping. By said lastmentioned transformation, samples in each block in the frequency domain can be distributed non-uniformly although corresponding samples in the time domain are distributed uniformly within the blocks.

Due to the function of the switch 01, those samples in the frequency domain in each block are excluded which have relatively low amplitudes in relation to the other samples in the block. In FIG. 2, it is indicated that samples with position numbers 4,5 and 9 have been excluded by switch 01 in block Nos. I and II.

On the receiver side, the multiplication coefficients stored in the memory are so chosen, that desired retransformation back to the time domain is obtained, by for example, an inverse discrete Fourier transform, an inverse discrete cosine transform or other similar inverse transform, depending on the method chosen for the unit TFC on the transmitter side.

The delay chains Fb and F, as mentioned, have an equal number of delay elements. When the delay chain Fb has been filled with received samples in a block, these samples rapidly are shifted over to the delay chain F and there they are utilized as input signals to the multiplication unit M, while the chain Fb again is filled with samples from the next following block. As the control signal from the logic unit LO indicates which samples in a block of samples in the frequency domain are excluded, it is possible to suitably choose coefficients for the samples remaining in the block.

In FIG. 3 a modification of the transmitter part of the apparatus is shown. The delay chain Fa here is preceded by a second switch 02 capable of excluding groups of samples. The groups may, but need not, contain an accurately equal number of samples as the blocks. On the receiver side, the frequency-time transformer F-M-S is capable both of transforming signal blocks of samples in the frequency domain to corresponding signal blocks of samples in the time domain and also to reconstruct the groups of samples excluded by the second switch 02. The delay chains Fb and F each have a number of delay elements equal to the numer of positions in two blocks of samples, so that two transferred blocks of samples are held simultaneously in each delay chain, for example the blocks I and II according to FIG. 4. Samples in missing blocks of samples, excluded by the function of the switch 02, are reconstructed in the unit F-M-S in the same way as the samples in the adjacent blocks by inverse transformation from the frequency domain to the time domain, but hereby these missing samples are formed as the mean value between samples in the frequency domain in the adjacent two blocks. Each sample in the frequency domain, in, for example block II thus, is formed as the mean value between corresponding samples in the adjacent blocks I and III. This is the simplest method of interpolation from the excluded samples. A more accurate method is to provided weighted interpolation coefficient of the samples in more than the very most nearby blocks, in which case, however, the delay lines must be longer.

FIG. 4 shows a chart a' of samples in the time domain where a block II is excluded, a corresponding chart b' in the frequency domain, and a chart c' of samples in the frequency domain where three samples (positions 4,5,9) are excluded in the blocks I and III.

I claim:

1. An apparatus for transforming a uniformly sampled signal to a non-uniformly sampled signal in a transmitter, transferring the signal thus non-uniformly sampled to a receiver, and re-transforming the transferred non-uniformly sampled signal to a uniformly sampled signal in the receiver, comprising:

a transmitter including:

a delay chain receiving the uniformly sampled signal and providing a plurality of outputs, a wave analyzer for emitting signals divided into frequency sectors, the analyzer including inputs connected to the outputs of the delay chain, and further including outputs, a logic unit connected to the outputs of the wave analyzer for analyzing the signals from the wave analyzer and generating a control signal dependant upon the result of said analysis, said control signal containing information on frequency sectors comprising samples with signal amplitudes which are low relative to the samples in other sectors, a time-frequency transformer for transforming signal blocks of samples in the time domain to corresponding signal blocks of samples in the frequency domain, the time-frequency transformer being connected to the outputs of the delay chain and to the logic unit;

a first switch for excluding certain samples in blocks of samples in the frequency domain in response to said control signal and outputting the same; and a receiver including:

a frequency-time transformer receving said frequency domain signals output from said switch and retransforming said signal blocks of samples in the frequency domain to corresponding signal blocks of samples in the time domain, said frequency-time transformer for reconstructing previously excluded samples and comprising:

a first delay chain having delay elements, for receiving said frequency domain signals and providing a plurality of outputs, a second delay chain with at least as many delay elements as said first delay chain, said second delay chain receiving said frequency domain signals and providing at least one output to the input of said first delay chain, a multiplication unit having a plurality of inputs connected to said outputs of said first delay chain and receiving said control signal from said transmitter, said multiplication unit being for weighted multiplication of samples with coefficients stored in a memory under control of the control signal, and an an addition unit having inputs connected to the outputs of the multiplication unit and adding together the samples therefrom to form the output of the apparatus.

2. The apparatus as claimed in claim 1 in which in said transmitter there is a second switch for excluding groups of samples, arranged preceeding the delay chain, and in the receiver the frequency-time transformer is capable of both transforming signal blocks of samples in the frequency domain to corresponding signal blocks of samples in the time domain and to reconstruct the groups of samples excluded by the second switch, and the first and second delay chains of the receiver have a number of elements equal to the number of positions in two blocks of samples.

* * * * *